United States Patent [19]
Paviak

[11] 3,819,540
[45] June 25, 1974

[54] SULFONATE DETERGENTS
[75] Inventor: Stanley C. Paviak, Shaler Twp., Allegheny County, Pa.
[73] Assignee: Gulf Research & Development Company, Pittsburgh, Pa.
[22] Filed: July 6, 1971
[21] Appl. No.: 160,210

[52] U.S. Cl. .............................................. 252/555
[51] Int. Cl. .............................................. C11d 1/14
[58] Field of Search ........... 252/535, 536, 554, 555, 252/89; 260/78.8

[56] References Cited
UNITED STATES PATENTS

| | | | |
|---|---|---|---|
| 2,645,615 | 7/1953 | Pollok | 252/89 |
| 3,301,829 | 1/1969 | Woodward et al. | 260/78.5 R |
| 3,332,877 | 7/1967 | Reuland et al. | 252/546 |
| 3,384,595 | 5/1968 | Broussalian | 252/555 |
| 3,436,378 | 4/1969 | Azorlosa et al. | 260/78.5 R |
| 3,640,880 | 2/1972 | Martin | 252/555 |
| 3,708,437 | 1/1973 | Sweeney | 252/555 |

FOREIGN PATENTS OR APPLICATIONS

| | | |
|---|---|---|
| 1,047,697 | 11/1966 | Great Britain |
| 1,194,862 | 6/1970 | Great Britain |

OTHER PUBLICATIONS

Stephan Chem. Co., "BioTerge AS-35CL," (Data Sheet), Sept. 12, 1967, pp. 1–5.
Zimmerman et al., "Handbook of Material Trade Names," Supplement IV, Industrial Research Services Inc., New Hamp., p. 130.
"Gantrez An...poly(methyl vinyl-ether/maleic anhydride)", GAF, Corp. N. Y., 1961, pp. 1 and 4.

*Primary Examiner*—Leon D. Rosdol
*Assistant Examiner*—P. E. Willis

[57] ABSTRACT

An aqueous composition of matter containing sodium alkene sulfonates or sodium hydroxy alkane sulfonates and a partially or fully neutralized copolymer of methyl vinyl ether and maleic anhydride in an amount sufficient to increase the viscosity thereof.

5 Claims, No Drawings

SULFONATE DETERGENTS

This invention relates to an aqueous composition of matter containing sodium alkene sulfonates, sodium hydroxy alkane sulfonates or mixtures thereof whose viscosity has been increased by the addition thereto of a selected amount of a partially or fully neutralized copolymer of methyl vinyl ether and maleic anhydride. These compositions have utility in those areas generally designated for light-duty liquid detergents and liquid hair shampoos.

The sodium sulfonates in the new composition herein can be defined as sodium alkene sulfonates, sodium hydroxy alkane sulfonates or any combination thereof, for example, wherein the weight ratio between the two can be from about 9:1 to about 3:7, preferably from about 1:1 to about 7:3, having from 12 to 18 carbon atoms in the molecule, preferably having from 14 to 16 carbon atoms in the molecule.

The sodium sulfonates in the new composition herein can be obtained from any source, but, preferably, are obtained by reacting an alpha olefin having from 12 to 18 carbon atoms, preferably from 14 to 16 carbon atoms, with $SO_3$, to obtain a sulfonated addition product thereof, and thereafter the sulfonation product is reacted with sodium hydroxide to obtain a product predominating in the corresponding sodium alkene sulfonates and sodium hydroxy alkane sulfonates having the same number of carbons as the reactant olefin.

The reaction of the normal alpha olefin with $SO_3$ in the first stage and the subsequent treatment of the sulfonated addition product with sodium hydroxide in the second stage can be carried out in any conventional manner, but in a preferred embodiment are carried out as follows. In the first stage $SO_3$ and an alpha olefin, or a mixture of olefins, for example, dodecene-1, tridecene-1, tetradecene-1, petadecene-1, hexadecene-1, heptadecene-1 or octadecene-1, wherein the molar ratio of $SO_3$ to said olefin is maintained, for example, within a range of about 0.85 to about 1.15 mols of $SO_3$ per mol of olefin, preferably within a range of about 0.98 to about 1.05 mol of $SO_3$ per mol of olefin. In order to help moderate the temperature within the reaction zone, a temperature regulated thin-film type reactor is employed and the $SO_3$ is introduced therein in admixture with a dry, inert gas, such as nitrogen, air, helium, $SO_2$, $CO_2$, etc. Volume per cent of $SO_3$ in the incoming gaseous stream can be maintained within a range of about one to about 20 per cent, preferably within a range of about three to about 10 per cent. The temperature in the reaction zone can be from about 0° to about 100° C., but preferably from about 20° to about 60° C. The pressure can be, for example, from about atmospheric to about 50 pounds per square inch gauge, preferably from about 5 to about 15 pounds per square inch gauge.

The time required for reaction between the olefin and $SO_3$ is difficult to define, since the reaction is exceedingly fast. In practice, the reaction zone is so designed and the flow of reactants therethrough is so adjusted that as soon as reaction between the $SO_3$ and the olefin is effected the sulfonation product resulting from such reaction is removed from the reaction zone. In general, the residence time of the sulfonation product can be, for example, less than about 120 seconds, preferably from about 0.1 to about 60 seconds.

The sulfonated addition product obtained above can then be cooled to a temperature of about 15° to about 30° C. and the pressure reduced, for example, to about one atmosphere. Inert gases and any unreacted $SO_3$ present are removed from the reaction mixture and can be recycled, if desired, to the first stage of the process. The product is then treated in a hydrolysis step with a molar equivalent of sodium hydroxide, based on the molar amount of $SO_3$ employed, plus from about one to about 10 mol per cent excess in sufficient water to yield a final sulfonate solution of from 10 to about 50 per cent, at a temperature of about 50° to about 200° C., preferably about 95° to about 175° C., and a pressure of about atmospheric to about 240 pounds per square inch gauge, for a period sufficient for the addition product to be completely neutralized.

The composition thus obtained can contain (1) from about 20 to about 80 per cent by weight, generally from about 30 to about 70 per cent by weight, of double bond positional isomers of water-soluble sodium alkene-1 sulfonic acids, including the alpha-beta, beta-gamma and gamma-delta unsaturated isomers thereof; and (2) from about 10 to about 70 per cent by weight, generally from about 20 to about 60 per cent by weight, of a mixture of water-soluble sodium salts of aliphatic compounds containing hydroxy and sulfonate radicals, with the sulfonate radical being on the terminal carbon and the hydroxyl radical being greater than two carbons away from said terminal carbon atom. There may also be present in an amount that can be from about two to about 20 per cent by weight of the composition, but generally in the range of about 5 to about 15 per cent thereof, a mixture of water-soluble sodium salts of alkene disulfonates and water-soluble sodium salts of hydroxy alkane disulfonates. Each of these sulfonates will also carry the same number of carbon atoms as the reactant olefin. Minor amounts of other species resulting from this reaction may also be present.

The sodium alkene sulfonates or the sodium hydroxy alkane sulfonates defined above, and particularly the mixture of sodium salts of the addition product of $SO_3$ with an alpha olefin defined above, are known to possess excellent detergency properties. A convenient form in which these detergents are used is as an aqueous solution thereof, wherein the sodium salt or mixture of sodium salts amounts to about 10 to about 50 per cent by weight thereof, preferably from about 20 to about 35 per cent by weight thereof. Although the detergency properties of these solutions are excellent they are very fluid. Lacking "body" these solutions are unattractive to consumers because of their watery consistency. Additives widely known to improve the viscosity of detergent solutions, such as small amounts of sodium chloride and the class of surfactants known as "alkanolamides", were found ineffective for this particular sulfonate composition.

I have found that the viscosity of such detergents can be increased without adversely affecting the desired detergency characteristics thereof by the simple expedient of adding thereto a selected amount of a partially or fully neutralized copolymer of methyl vinyl ether and maleic anhydride. Although the amount of partially or fully neutralized copolymer of methyl vinyl ether and maleic anhydride added to the aqueous solution of sodium alkene sulfonates, sodium hydroxy alkane sulfonates or mixtures thereof will depend upon the initial viscosity of the aqueous solution, which in turn depends upon the amount of sodium sulfonate therein, and the ultimate viscosity desired; in general, the amount of partially or fully neutralized copolymer of methyl vinyl ether and maleic anhydride added is such that the composition will contain the following, in per cent by weight: about five to about 50 per cent sulfonate(s), and about 0.5 to about 5 per cent of the partially or fully neutralized copolymer of methyl vinyl ether and maleic anhydride, but preferably as follows: about 10 to about 35 per cent sulfonate(s), and about one to about three per cent of the partially or fully neutralized copolymer of methyl vinyl ether and maleic anhydride. The balance of this composition will contain water, but can include other additives which improve the performance of the sulfonate composition as is often required of detergent formulations and known to those skilled in the art. The viscosity of the initial aqueous solution will generally be in the range of about 5 to about 45 centistokes, measured at room temperature. In a preferred embodiment the viscosity of the aqueous solution is raised to at least a fourfold increase by the addition thereto of the partially or fully neutralized copolymer of methyl vinyl ether and maleic anhydride, and in an especially preferred embodiment the viscosity of the ultimate composition herein is in the range of about 100 to about 5,000 centistokes.

A recurring segment of the copolymer of methyl vinyl ether and maleic anhydride used herein can be defined as follows:

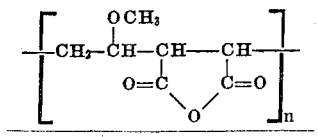

with $n$ being the number of segments thereof. The specific viscosity, $\eta sp$, of the copolymer used herein, that is, of a solution of one gram of the copolymer in 100 milliliters of methyl ethyl ketone at 25° C., ranges from about 1.5 to about 4.0, preferably from about 2.0 to about 3.5. I use a partially or fully neutralized copolymer of the above, wherein such neutralization is effected with a hydroxide of an alkali metal, such as sodium, potassium or ammonium. Using sodium hydroxide as an example, the partially neutralized recurring unit is defined as follows:

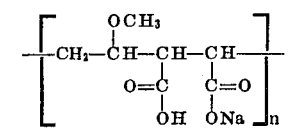

while the fully neutralized unit would be defined as follows:

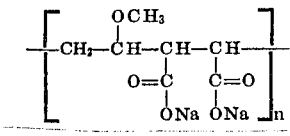

The neutralized copolymer is easily obtained, for example, by heating, while stirring, the copolymer with the stoichiometric amount of alkali metal hydroxide needed to obtain the partial or fully neutralized copolymer, for example, an alkali metal hydroxide, such as sodium hydroxide.

The invention defined and claimed herein can be further illustrated by the following. A sodium alpha olefin sulfonate was obtained by a procedure which involved bringing into contact a mixture containing two parts by weight of tetradecene-1 and one part by weight of hexadecene-1 with a gaseous mixture containing $SO_3$ and an inert gas, wherein the molar ratio of said $SO_3$ to said combined alpha olefins was about 1.05:1, and then treating the resulting addition product of said olefins and said $SO_3$ with an aqueous sodium hydroxide solution to obtain a detergent mixture predominating in the corresponding sodium alkene sulfonates and sodium hydroxy alkane sulfonates of said reactant olefins.

Some of the product so obtained was diluted with water to obtain an aqueous solution thereof wherein the sodium sulfonates therein constituted 19 per cent by weight thereof. To one portion of such aqueous solution there was added copolymer of methyl vinyl ether and maleic anhydride that had been fully neutralized, as defined above, with sodium hydroxide so that the resultant solution contained one per cent by weight of said copolymer. To other portions of the aqueous sodium sulfonate solution there was added a copolymer of methyl vinyl ether and maleic anhydride that had been partially neutralized, as defined above, with sodium hydroxide so that the resultant solutions contained one and two per cent of said copolymer.

The copolymer used in each of the above, before neutralization, had a specific viscosity ranging from 2.6 to 3.5. The results obtained above are tabulated below in Table I, wherein each of the solutions obtained above is defined, respectively, as Examples I, II, III and IV. Viscosity measurements were made at room temperature by the use of a Gardner Bubble Viscometer wherein the samples were matched with standards of known viscosity. The approximate viscosity was obtained in centistokes (cs) and conversion thereof to centipoises (cps) can be obtained by multiplication of the value obtained by the density of the sample.

Table I

| Example | Weight Per Cent of copolymer in Solution | Viscosity (cs) at Room Temperature |
|---|---|---|
| I | 0 | 6 |
| II | 1 | 32 |
| III | 1 | 27 |
| IV | 2 | 113 |

The above demonstrates the advantages of using the defined copolymer in preparing the unique compositions of this invention. The viscosity of an aqueous solution containing 19 per cent of the defined sodium sulfonates is about 6. Merely adding sufficient copolymer so that about one per cent thereof is present in the final solution raised the viscosity to 32 in Example II and 27 in Example III. Two per cent copolymer raised the viscosity to 113 in Example IV. That substantially similar results will be obtained whether the copolymer is partially or fully neutralized is apparent from an inspection of Examples II and III. In each instance one per cent by weight of copolymer was used, but in Example II the copolymer was fully neutralized, while in Example III it was partially, or half, neutralized. Yet the results obtained in each case are similar. No separation of copolymer was noted in these examples, even after cooling to about 45° F., and more importantly recovered after freezing to clear solutions.

The copolymer used herein is believed to be unique in increasing viscosities of the sodium sulfonate detergents used herein, since various polymeric materials used for the thickening of aqueous solutions are ineffective or incompatible. I have used a hydroxyethylcellulose, and found only a slight increase in the viscosity of the sodium sulfonate solution and the product was hazy. Carboxymethylcellulose was also ineffective in increasing the viscosity of a sodium sulfonate solution, and the composition was cloudy and settling of the additive was noted. Carboxylic vinyl polymers were completely ineffective and the solution obtained was cloudy. Ethylene-maleic anhydride copolymers were somewhat effective, but resulted in cloudy dispersions.

Although the composition herein has been defined as containing alkali metal sulfonates and partially or fully neutralized copolymers of methyl vinyl ether and maleic anhydride, it is understood that the same can also include other ingredients that may be required for commercial purposes, such as alkanolamides as foam modifiers, other surfactants and minor amounts of colorants, opacifiers, perfumes, buffers, etc.

Although I have shown herein that the addition of partially or fully neutralized copolymers of methyl vinyl ether and maleic anhydride to sodium alkene sulfonates and/or sodium hydroxy alkane sulfonates will increase the viscosity of said sulfonates, the same improvement will also be obtained when said partially or fully neutralized copolymers of methyl vinyl ether and maleic anhydride are added to the corresponding potassium, ammonium and magnesium sulfonates, since the beneficial effect obtained herein resides with the anionic portion of the surfactant.

Obviously, many modifications and variations of the invention, as hereinabove set forth, can be made without departing from the spirit and scope thereof, and therefore only such limitations should be imposed as are indicated in the appended claims.

I claim:

1. An aqueous composition of matter consisting essentially of (1) about five to about 50 per cent by weight of sodium sulfonates, defined hereinafter, (2) about 0.5 to about five per cent by weight of the sodium, potassium or ammonium salt of a copolymer of methyl vinyl ether and maleic anhydride having a specific viscosity of about 1.5 to about 4.0 and (3) the remainder water, said amount of said salt of said copolymer being sufficient to increase the viscosity of a mixture of said amount of water and said amount of sodium sulfonates, said sodium sulfonates having been obtained by reacting from about 0.85 to about 1.15 mols of $SO_3$ with about one mol of an alpha olefin having from 12 to 18 carbon atoms at a temperature of about 0° to about 100° C. over a period of about 0.1 to about 60 seconds to obtain a sulfonation addition product, and neutralizing said sulfonation addition product with sodium hydroxide in water at a temperature of about 50° to about 200° C., resulting in the production of a mixture consisting essentially of sodium alkene sulfonates, sodium hydroxy alkane sulfonates, sodium alkene disulfonates and sodium hydroxy alkane disulfonates, each having from 12 to 18 carbon atoms, said latter mixture constituting the sodium sulfonates of the first-mentioned aqueous composition of matter.

2. The composition of claim 1 wherein the composition of matter contains from about 10 to about 35 per cent by weight of sodium sulfonates and about one to about three per cent by weight of the salt of the copolymer.

3. The composition of claim 1 wherein the salt of the copolymer is the sodium salt thereof.

4. The composition of claim 1 wherein a recurring unit of the salt of the copolymer is defined as follows:

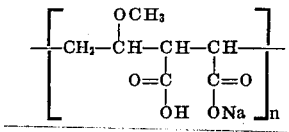

with $n$ being the number of units thereof.

5. The composition of claim 1 wherein a recurring unit of the salt of the copolymer is defined as follows:

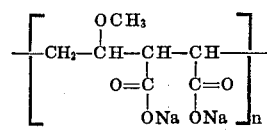

with $n$ being the number of units thereof.

* * * * *